(12) United States Patent
Greer et al.

(10) Patent No.: US 8,332,103 B2
(45) Date of Patent: Dec. 11, 2012

(54) VEHICLE WHEEL AUTO-LOCATION USING WHEEL PHASE ANGLE INFORMATION

(75) Inventors: John Greer, Randalstown (GB); Paul McGrotty, Carnmoney (GB); Samuel Strahan, Broughshane (GB)

(73) Assignee: Schrader Electronics Ltd., Northern Ireland (GB)

( * ) Notice: Subject to any disclaimer, the term of this patent is extended or adjusted under 35 U.S.C. 154(b) by 224 days.

(21) Appl. No.: 12/888,247

(22) Filed: Sep. 22, 2010

(65) Prior Publication Data

US 2011/0071737 A1    Mar. 24, 2011

Related U.S. Application Data

(60) Provisional application No. 61/277,334, filed on Sep. 22, 2009.

(51) Int. Cl.
*G06F 17/00* (2006.01)

(52) U.S. Cl. .......... 701/49; 701/31.4; 701/33.8; 701/70; 701/72; 701/83; 701/84; 701/91; 701/493; 303/61; 303/113.1; 303/115.2; 303/186; 303/189; 340/438; 340/439; 340/442; 340/445; 180/167; 180/197; 310/114; 310/168

(58) Field of Classification Search .......... 701/31.4, 701/33.8, 49, 70, 72, 83, 84, 91, 493; 303/61, 303/113.1, 115.2, 186, 189, 901; 324/174, 324/207.16, 207.25; 340/438, 439, 442, 340/445; 384/448; 192/223.4; 180/167, 180/197; 310/114, 168; 188/18 A, 71.5; 280/93.512; 73/118.01

See application file for complete search history.

(56) References Cited

U.S. PATENT DOCUMENTS

| | | | | |
|---|---|---|---|---|
| 4,966,034 A * | 10/1990 | Bock et al. | ..................... | 73/146.5 |
| 5,612,671 A * | 3/1997 | Mendez et al. | ............... | 340/447 |
| 6,112,587 A | 9/2000 | Oldenettel | | |
| 6,340,930 B1 * | 1/2002 | Lin | ............... | 340/447 |
| 6,435,020 B1 | 8/2002 | Oldenettel et al. | | |
| 6,486,773 B1 | 11/2002 | Bailie et al. | | |
| 6,885,293 B2 * | 4/2005 | Okumura | ..................... | 340/448 |

(Continued)

FOREIGN PATENT DOCUMENTS

EP    0 997 326 A2    5/2000

(Continued)

OTHER PUBLICATIONS

PCT International Search Report and Written Opinion for PCT/US2011/056823, mailing date Jan. 18, 2012.

(Continued)

*Primary Examiner* — James Trammell
*Assistant Examiner* — McDieunel Marc
(74) *Attorney, Agent, or Firm* — Brinks Hofer Gilson & Lione

(57) ABSTRACT

Systems and methods for auto-location of tire pressure monitoring sensor units on a vehicle measure the angle of a wheel at two different times using a rim mounted or a tire mounted sensor and determines a difference in measured angles. The systems and methods provide for transmitting the angles and/or the difference in the measured angles along with a sensor identification to an electronic control module. Alternatively, the systems and methods provide for transmitting time differences to the electronic control module. The electronic control module correlates information transmitted from the wheel unit with antilock brake system data. A location of the wheel mounting the sensor is determined and the sensor identification is assigned.

21 Claims, 10 Drawing Sheets

U.S. PATENT DOCUMENTS

| | | | |
|---|---|---|---|
| 6,922,140 B2 | 7/2005 | Hernando et al. | |
| 6,988,026 B2 * | 1/2006 | Breed et al. | 701/31.4 |
| 7,010,968 B2 | 3/2006 | Stewart et al. | |
| 7,053,761 B2 * | 5/2006 | Schofield et al. | 340/447 |
| 7,205,886 B2 * | 4/2007 | Kin | 340/442 |
| 7,336,161 B2 | 2/2008 | Walraet | |
| 7,362,218 B2 | 4/2008 | McCall et al. | |
| 7,367,227 B2 | 5/2008 | Stewart et al. | |
| 7,404,427 B2 * | 7/2008 | Hillman et al. | 157/1 |
| 8,013,725 B2 * | 9/2011 | Murata et al. | 340/447 |
| 2002/0084896 A1 * | 7/2002 | Dixit et al. | 340/447 |
| 2004/0257213 A1 * | 12/2004 | Tsujita | 340/445 |
| 2005/0068161 A1 * | 3/2005 | Ichinose et al. | 340/445 |
| 2011/0071737 A1 | 3/2011 | Greer et al. | |
| 2011/0169627 A1 | 7/2011 | Fink | 340/442 |
| 2011/0313623 A1 * | 12/2011 | Greer et al. | 701/49 |

FOREIGN PATENT DOCUMENTS

| | | |
|---|---|---|
| WO | WO 2010/034703 A1 | 4/2010 |
| WO | WO 2011/085877 A1 | 7/2010 |

OTHER PUBLICATIONS

International Search Report and Written Opinion for PCT/US2010/049871 dated Dec. 6, 2010.

* cited by examiner

Figure 3B
(a)
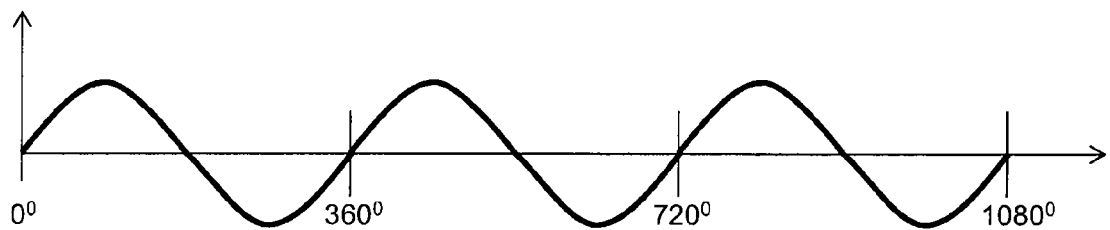
(b)

VEHICLE WHEEL AUTO-LOCATION USING WHEEL PHASE ANGLE INFORMATION

PRIORITY

This application claims priority to Provisional Application No. 61/277,334 filed on Sep. 22, 2009, entitled "Use of Wheel Phase Angle to Perform Auto-Location in a Tire Pressure Monitoring System," the disclosure of which is incorporated here in its entirety. This application relates to Provisional Application No. 61/400,622 filed Jul. 30, 2010, entitled "Tire Monitoring System Auto-Location Using Correlation of Wheel Rotational Information" and Provisional Application No. 61/339,015 filed Feb. 26, 2010, entitled "Wheel Position Determination Systems and Methods Using Revolution Counter Information From Tire Pressure Monitoring Wheel Units," the disclosures of which are incorporated here in their entirety.

BACKGROUND

1. Technical Field

This invention relates generally to a system and method for performing auto-location of a wheel in a vehicle and more particularly to a tire pressure monitoring system and method for performing auto-location of a wheel in a vehicle using wheel phase angle information.

2. Related Art

In tire pressure monitoring systems, performing auto-location of a wheel is needed for a number of reasons. Tire pressure monitoring systems generally include a sensor in or at each wheel of a vehicle and a central controller which receives tire pressure information from each sensor, to be reported to the driver of the vehicle. Auto-location is the identification of each sensor and determination of its position on the vehicle, automatically and without human intervention. Auto-location may be done initially upon installation and subsequently in the event of tire rotation or replacement. Performing auto-location involves determining the identity or serial number of a tire pressure monitoring (TPM) sensor in each of the wheels in the car. In premium vehicles, knowing the identity of the TPM sensor in each wheel allows a pressure by position display to be implemented and shown to the driver. In base vehicles with different placard tire pressures for front and rear axles, it is desirable to know TPM sensor identities and positions in order to check pressure against a correct threshold for an applicable axle.

SUMMARY

The present invention is directed to tire pressure monitoring systems and methods in which a measurement from a wheel is combined with antilock brake system ("ABS") data to allow identification of the tire pressure monitoring sensors to a specific location on a vehicle. The present systems and methods are particularly well suited for use with tire pressure monitoring systems that use rim mounted sensors that can deduce the instantaneous wheel angle using shock sensors. Alternatively, or additionally, the present systems and methods can also be practiced in a tire pressure monitoring system that uses a rim mounted sensor which is able to deduce the instantaneous wheel angle using accelerometers. The present systems and methods are also well suited for use with tire pressure monitoring systems that use tire mounted sensors that deduces the instantaneous wheel angle. This method of auto-location is not limited to the use of accelerometric devices. For example, periodic signals from which phase information can be deduced may also be used. Devices such as Hall effect sensors or sensors which respond to 'road strike' may be used to deduce the phase information.

Advantageously, most vehicles employ ABS. The ABS allows independent wheel speeds to be monitored in near real-time. Correlation between ABS data and other data from sensors can be used to locate wheel positions.

By way of one example, one embodiment of a method for performing auto-location of a wheel in a vehicle using wheel phase angle information includes (i) arranging a wheel unit to be associated with a wheel of the vehicle, the wheel unit comprising a tire pressure monitoring sensor and a wheel phase angle sensor and the wheel unit transmitting tire pressure measured by the tire pressure monitoring sensor; (ii) arranging an antilock brake system ("ABS") sensor to be associated with each wheel of the vehicle, the ABS sensor producing ABS data indicative of the wheel phase angle; (iii) upon rotation of the wheel, measuring a wheel phase angle at a first time (T1) and at a second time (T2) with the wheel phase angle sensor; (iv) at the second time (T2), transmitting from the wheel unit a frame of data comprising wheel phase angle information and an identification of the tire pressure monitoring sensor; (v) at an electronic control unit ("ECU"), receiving the frame of data and calculating the first time (T1) based on a predetermined time delay; (vi) receiving the ABS data associated with each wheel; (vii) correlating the wheel phase angle information with the ABS data at the calculated first time (T1) and the second time (T2); and (viii) assigning the identification to a location of the wheel whose ABS data matches with the wheel phase angle information.

Another embodiment of the present invention includes a tire pressure monitoring system for performing auto-location of a wheel in a vehicle using wheel phase angle information. The tire pressure monitoring system includes a wheel unit to be associated with a wheel of the vehicle. The wheel unit includes a tire pressure monitoring sensor that measures tire pressure of the wheel and a wheel phase angle sensor that measures a wheel phase angle at a first time (T1) and at a second time (T2). The wheel unit transmits at the second time (T2) a radio frequency message. The radio frequency message includes wheel phase angle information, an identification of the tire pressure monitoring sensor; and the measured tire pressure.

The tire pressure monitoring system further includes an antilock brake system ("ABS") sensor associated with each wheel of the vehicle and operable to provide ABS data indicative of the wheel phase angle. The tire pressure monitoring system further includes an Electronic Control Unit ("ECU") in communication with the wheel unit and the ABS sensor. The ECU may be operable to execute instructions of calculating the first time (T1) based on a predetermined time delay, correlating the wheel phase angle information with the ABS data at the calculated first time (T1) and the second time (T2); and to assign the identification to a location of the wheel whose ABS data matches with the wheel phase angle information.

Another embodiment of the present invention is directed to a wheel unit for use with a tire pressure monitoring system for performing auto-location of a wheel in a vehicle using wheel phase angle information. The wheel unit includes a tire pressure monitoring sensor that measures tire pressure of the wheel and a wheel phase angle sensor that measures a wheel phase angle at a first time (T1) and at a second time (T2). The wheel unit further includes an electronic circuit that determines a wheel phase angle difference based on wheel phase angle measurements at the first time (T1) and the second time (T2) and encodes a radio frequency message. The radio frequency message includes wheel phase angle information, an identification of the tire pressure monitoring sensor and the measured tire pressure. The wheel unit also includes a radio frequency transmitter that transmits the radio frequency message at the second time (T2). The wheel unit is associated with each wheel of the vehicle and mounted on the wheel of the vehicle.

Another embodiment of the present invention is directed to a method for performing auto-location of a wheel which comprises (i) upon rotation of the wheel, measuring a first time (T1) that a wheel phase angle reaches a first phase angle (P1) with the wheel phase angle sensor and (ii) measuring a second time (T2) that the wheel phase angle reaches a second phase angle (P2) after the wheel rotates a predetermined phase angle known to the wheel unit. The method further comprises (i) transmitting from the wheel unit a radio frequency message which includes an identification of the tire pressure monitoring sensor and a time difference between the first time (T1) and the second time (T2) and (ii) at an electronic control unit ("ECU"), correlating the time difference with the ABS data and assigning the identification to a location of the wheel whose ABS data matches with the predetermined phase angle within the time difference.

Another embodiment of the present invention is directed to a system for performing auto-location of a wheel. The system comprises a wheel unit having a wheel phase angle sensor that determines a first time (T1) when the wheel rotates to reach a first phase angle (P1) and a second time (T2) when the wheel further rotates through a predetermined phase angle to reach a second phase angle (P2). The wheel unit further comprises an electronic circuit that stores the first and the second time (T1, T2) and determines a time difference (T2–T1) between the first time (T1) and the second time (T2). The electronic circuit is further operable to encode a radio frequency message comprising the time difference, an identification of the tire pressure monitoring sensor and the measured tire pressure.

The system also includes an antilock brake system ("ABS") sensor associated with each wheel of the vehicle and operable to provide ABS data indicative of the wheel phase angle and an electronic control unit ("ECU") in communication with the wheel unit and the ABS sensor, the ECU operable to execute instructions of: (i) receiving the time difference and the identification; (ii) correlating the time difference with wheel phase angle information represented by the ABS data; and (iii) assigning the identification to a location of the wheel whose ABS data has swept through the predetermined phase angle within the time difference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification and in which like numerals designate like parts, illustrate embodiments of the present invention and together with the description, serve to explain the principles of the invention. In the drawings:

FIG. 3B illustrates phase varying signals from different sensors.

DETAILED DESCRIPTION

The present invention is directed to systems and methods in which a measurement from a wheel is combined with antilock brake system (ABS) data to allow identification of the tire pressure monitoring sensors to a specific location on a vehicle. In accordance with various embodiments of the present invention, a tire pressure monitoring system comprises wheel rim or tire mounted TPM sensors, typically four, and an Electronic Control unit (ECU) that receives signals from the TPM sensors. In addition, the system employs data presented to the ECU from the Anti-lock Brake System (ABS).

Figure 1:
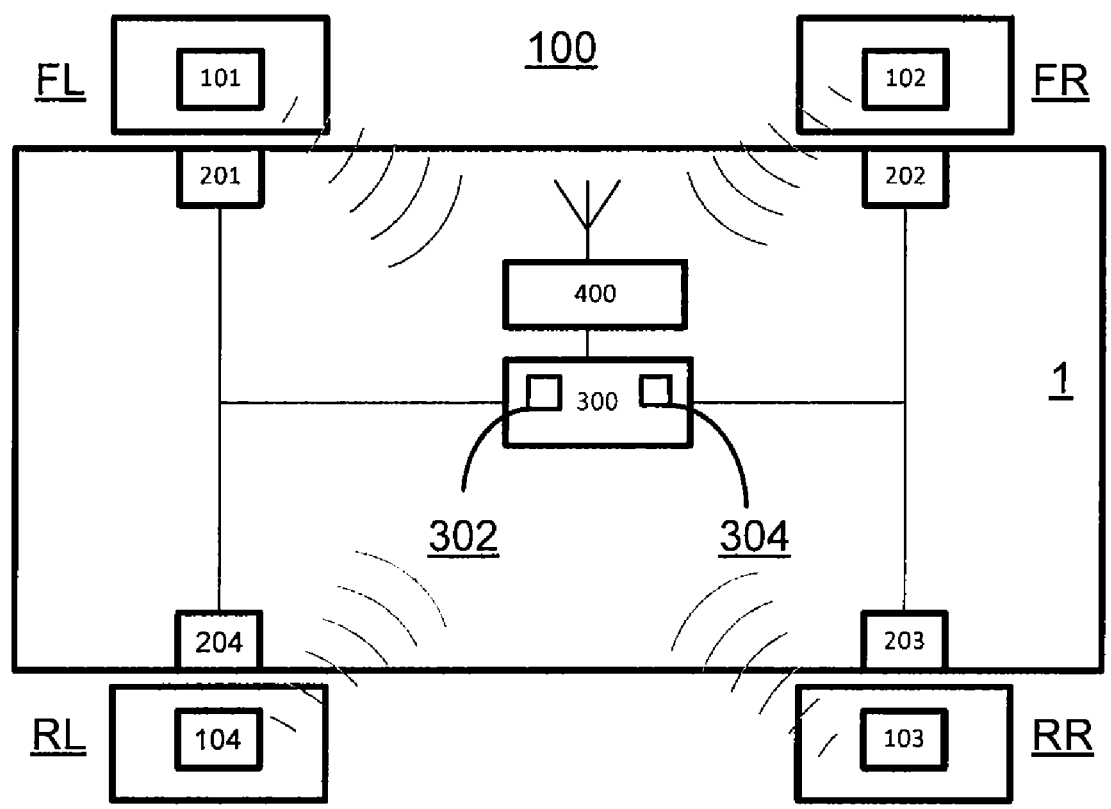
FIG. 1 illustrates one embodiment of a tire pressure monitoring system.

FIG. 1 illustrates a tire pressure monitoring system 100 according to a first embodiment of the present invention. The system 100 is arranged in a standard vehicle 1 having four wheels. Four wheels include a front left wheel (FL), a front right wheel (FR), a rear left wheel (RL) and a rear right wheel (RR). In another embodiment, the system 100 may be arranged in any other vehicle having a different number of wheels. The system 100 includes wheel units 101, 102, 103 and 104 that are associated with each wheel of the vehicle 1.

The system 100 further includes four antilock brake system (ABS) sensors 201, 202, 203 and 204. ABS sensors 201-204 are also associated with each wheel of the vehicle 1. Accordingly, each wheel is assigned with one of the wheel units 101, 102, 103 and 104 and one of ABS sensors 201, 202, 203 and 204.

The system 100 also includes an Electronic Control Unit (ECU) 300 and a receiver 400. The ECU 300 is coupled to the ABS sensors 201-204 via a communication bus such as a Controller Area Network (CAN) bus and receives ABS data from the ABS sensors 201-204. The ECU 300 includes a processor 302 and a storage 304. The ECU 300 operates to store received ABS data in the storage 304 to provide a historic ABS trace. The ECU 300 may be implemented by any suitable means, for example a microprocessor, microcontroller, an Application Specific Integrated Circuit (ASIC), or other suitable data processing device programmed to perform the functions described herein. Further, the ECU 300 may communicate with other vehicle components using any other suitable device, either wire line or wireless. The CAN bus is an exemplary implementation of data communication among components of the vehicle.

The ECU 300 also receives data from the wheel units 101, 102, 103 and 104 via the receiver 400. For example, the wheel units 101, 102, 103 and 104 transmit radio frequency or other wireless communications conveying data and other information to the ECU 300. The respective wheel units include a suitable radio transmission circuit and the ECU 300 includes a suitable radio reception circuit for radio communication. Further, the radio circuits may use an agreed upon transmission and reception format and data encoding technique. The ECU 300 operates to correlate the data received from the wheel units 101, 102, 103 and 104 with the ABS data in order to perform auto-location, as will be discussed in detail below.

Figure 2:
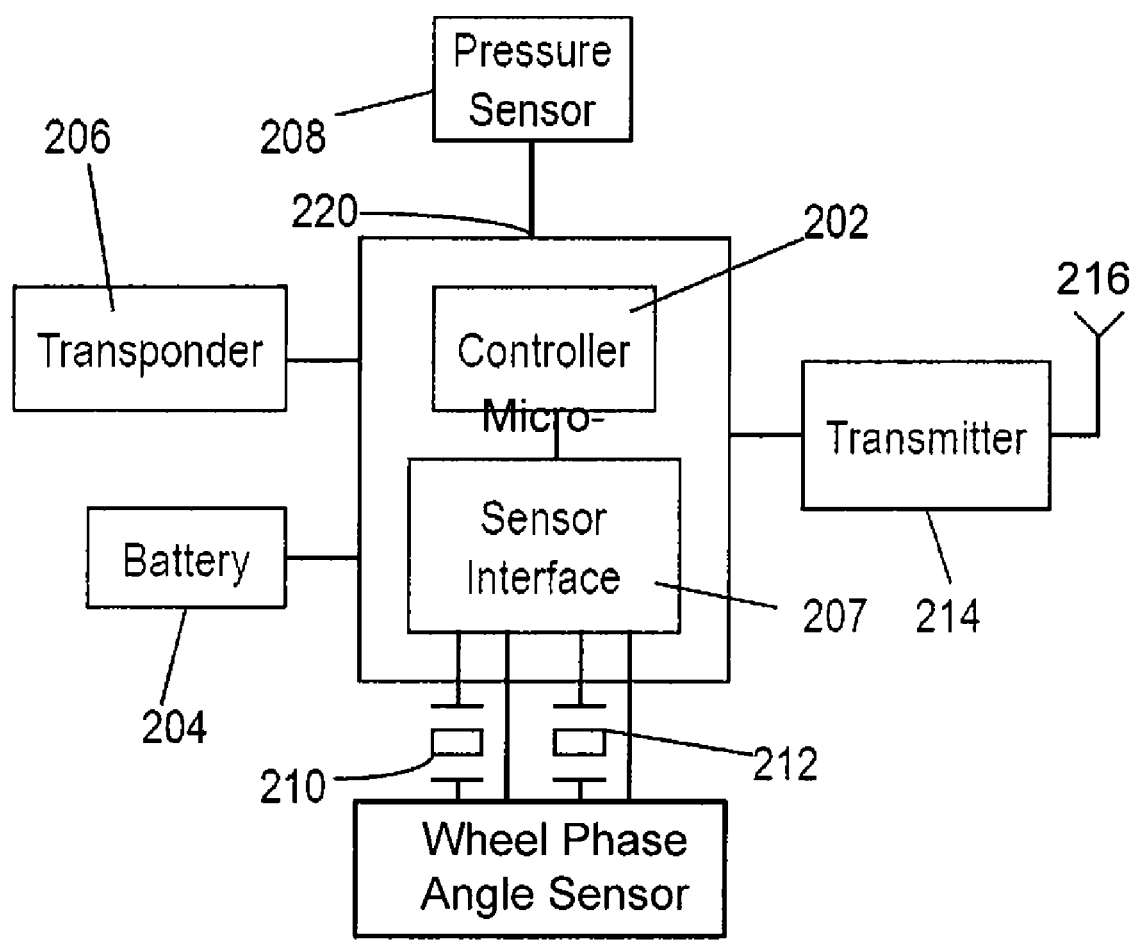
FIG. 2 illustrates one embodiment of a wheel unit for use with the tire pressure monitoring system.

Referring to FIG. 2, the structure of the wheel unit 101 is illustrated in more detail. The wheel units 102-104 may incorporate the same structure as that of the wheel unit 101. As shown in FIG. 2, the wheel unit 101 includes a microcontroller 202, a battery 204, a transponder coil 206, a sensor interface 207, a pressure sensor 208, a wheel phase angle sensor 212, a transmitter 214 and an antenna 216. The microcontroller 202 is coupled to the sensor interface 207. The sensor interface 207 is coupled to the wheel phase angle sensor 212. The wheel phase angle sensor 212 measures a wheel phase angle at multiple different times. The wheel phase angle sensor 212 provides measurements to the sensor interface 207. The sensor interface 207 receives the measurements of the wheel phase angle sensor 212 in the form of an electrical output signal. The sensor interface 207 receives the electrical output signal and amplifies and filters the signal. The sensor interface 207 sends the processed signal to an analog to digital converter (not shown) in order to convert the signal into a digital signal. The microcontroller 202 receives the digital form of the output signal from the wheel phase angle sensor 212 for processing.

In the illustrated embodiment, the pressure sensor 208 detects the pneumatic air pressure of the tire with which the wheel unit 101 is associated. In alternative embodiments, the pressure sensor 208 may be supplemented with or replaced by a temperature sensor or other devices for detecting tire data. An indication of the tire pressure data is sent to the microcontroller 202 via the analog-to-digital converter (not shown).

The battery 204 is a power source of the wheel unit 101. The transponder coil 206 detects external activation of the transponder by a signal applied by a remote exciter and may modulate a signal to communicate data to a remote detector from the wheel unit 101. The wheel unit 101 provides data including tire pressure from the pressure sensor 208 and the wheel phase angle information from the wheel phase angle sensor 212 through the transmitter 214 and the antenna 216 to the ECU 300 (see FIG. 1).

Upon rotation of a wheel, the wheel phase angle sensor 212 operates to measure a wheel phase angle. The wheel phase angle measurements may not have to be against an absolute reference. In other words, the phase measurements do not have to be measured from a top of wheel, or road striking point. The key piece of information may be a phase difference, or a phase delta of the wheel, and therefore, the requirement is that two different phase angles are measured relative to the same angle. The reference may be arbitrarily selected based on accuracy capability and ease of implementation. The wheel phase angle sensor 212 may be mounted on a rim of the wheel, or a tire mounted sensor. Alternatively, or additionally, the wheel phase angle sensor 212 may be arranged on any suitable location associated with a wheel. In one embodiment, the wheel phase angle 212 includes a rotation sensor. For example, the rotation sensor may be a piezoelectric rotation sensor which measures a wheel phase angle based on the gravitational force. Specifically, as the wheel rotates, the gravitational force causes a sensing element of the rotation sensor to experience different forces which results in a different output signal representing a wheel phase angle or wheel angular position. In that way, the rotation sensor produces an output signal indicating a wheel phase angle at a predetermined time. The output signal of the rotation sensor may have different amplitude and/or different polarity depending on the wheel phase angle. For instance, the rotation sensor produces the output signal having amplitude M at 0 degree and having the amplitude −M at 180 degree. Alternatively, or additionally, any conventional rotation sensor may be used as the wheel phase angle sensor 212.

In another embodiment, the wheel phase angle sensor 212 comprises a shock sensor of the type that produces an electrical signal in response to acceleration. The electrical signal is indicative of, or typically proportional to, the experienced change in acceleration. Alternatively, the wheel phase angle sensor 212 may each comprise an accelerometer or a microelectromechanical systems (MEMS) sensor. The main difference between an accelerometer and a shock sensor is that the output signal from a shock sensor is related to a change of force applied to the shock sensor, whereas the output signal from an accelerometer is proportional to the absolute force applied. Shock sensors may be implemented, for example, with shock sensors discussed in commonly owned U.S. Pat. No. 7,362,218, issued Apr. 22, 2008 and entitled Motion Detection Using A Shock Sensor In A Remote Tire Pressure Monitor System and commonly owned U.S. Pat. No. 7,367,227, issued May 6, 2008 and entitled Determination Of Wheel Sensor Position Using Shock Sensors And A Wireless Solution, the disclosures of which are incorporated here in its entirety. Accelerometer sensors may be implemented, for example, with sensors discussed in commonly owned U.S. Pat. No. 7,010,968, issued Mar. 14, 2006 and entitled Determination Of Wheel Sensor Position Using A Wireless Solution, the disclosure of which is incorporated here in its entirety.

Figure 3A:
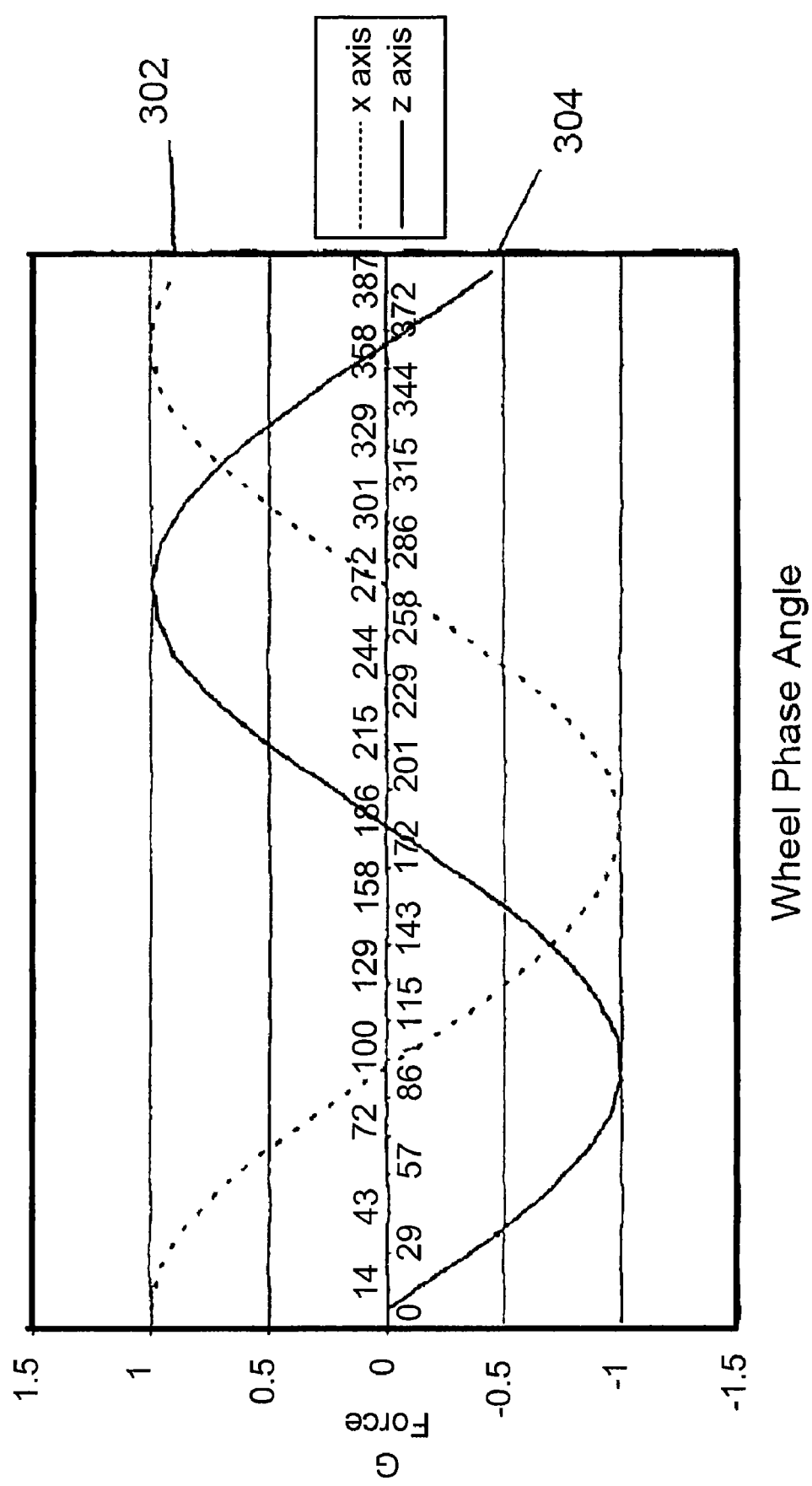
FIG. 3A illustrate a wheel phase angle as a function of the gravitational force, i.e., acceleration

In the embodiment where shock sensors or accelerometers are used as the wheel phase angle sensor 212, FIG. 3A is a graph illustrating a wheel phase angle or a wheel angular position as a function of the gravitational force or acceleration. In the illustrated embodiment, the wheel rotates counter clockwise, and acceleration along the z axis 304 leads acceleration along the x axis by approximately 90 degrees. The output signal is a sinusoid with a period equal to one revolution of the wheel. The magnitude of the output signal is a voltage proportional to the change in acceleration or acceleration experienced by the wheel phase angle sensor 212 such as the shock sensors or accelerometers as they rotate. The graph as shown in FIG. 3A is by way of example, and the actual acceleration experienced in a moving wheel may be different from the amount illustrated in FIG. 3A.

FIG. 3B(a) illustrates phase varying signals output from the wheel phase angle sensor 212 which may be a shock sensor or an accelerometer. FIG. 3B(b) illustrates phase varying signals output from the wheel phase angle sensor 212 which may be a Hall effect sensor, or a road striking sensor. The phase varying signals illustrated in FIGS. 3B (a) and (b) are input to the microcontroller 202. The microcontroller 202 recognizes a repeated pattern in the phase varying signals and determines one rotation of the wheel. Then, the microcontroller 202 determines how far through the one rotation of the wheel it is at the first time (T1) and the second time (T2) and determines a first phase angle (P1) and a second phase angle (P2). Assuming that the phase-varying signal does not change its characteristics between the first time (T1) and the second time (T2), the first phase angle (P1) and the second phase angle (P2) will be relative to each other, and can be used as auto-location data.

Referring back to FIG. 2, the sensor interface 207 is configured to provide the necessary control signals and detect the electrical signals from the wheel phase angle sensor 212 such as the shock sensor. As discussed above, the shock sensor detects change in acceleration to produce an output in the form of an electrical charge output signal. The output signal is typically in the order of 1 mV/g. Preferably, if the wheel phase angle sensor 212 includes more than one shock sensor, shock sensors can share the same interface 207 via multiplexing.

Through the sensor interface 207, the microcontroller 202 receives output signals representing wheel phase angle from the wheel phase angle sensor 212. The microcontroller 202 may include, for example a memory for data storage and a data processing unit. The microcontroller 202 stores a received wheel phase angle, or data related thereto, for a later transmission to the ECU 300. The microcontroller 202 may not transmit every time the output signal has been received. In one embodiment, the microcontroller 202 calculates and determines a difference in two wheel phase angles measured by the wheel phase angle sensor 212. For instance, the microcontroller 202 subtracts a first wheel phase angle measured at a first time (T1) from a second wheel phase measured at a second time (T2).

The microcontroller 202 encodes and transmits a radio frequency message via the transmitter 214 and the antenna 216. The radio frequency message includes, among other things, tire pressure information, an identifier of the wheel unit 101, and wheel phase angle information. The wheel phase angle information may include wheel phase angles measured at different times. In another embodiment, the wheel phase angle information may include wheel phase angle measured at a transmission time and a difference in wheel phase angle measured at two different times. Alternatively, the wheel phase angle information may include only the difference in wheel phase angles.

Referring again back to FIG. 1, the ECU 300 receives the radio frequency message from the wheel unit 201. The ECU 300 stores the radio frequency message, or data contained in the radio frequency message. Such data may be stored in the storage 304 which is suitable data store such as a memory device. Also, the ECU 300 extracts the tire pressure, the identifier, and the wheel phase angle information from the radio frequency message. The ECU 300 correlates the wheel phase angle information with the ABS data from the ABS sensors 201-204. In other words, the ECU 300 analyzes the ABS data and determines a wheel phase angle or a wheel phase angle difference which is indicated by and corresponds to the ABS data. The ECU 300 compares the wheel phase angle information from the wheel unit 101 with the wheel phase angle or the wheel phase angle difference of the ABS data in order to determine the closest match. Upon finding the closest match, the ECU 300 assigns the identifier sent from the wheel unit 101 to a wheel whose ABS data most closely matches with the wheel phase angle information from the wheel units 101-104.

Figure 4:
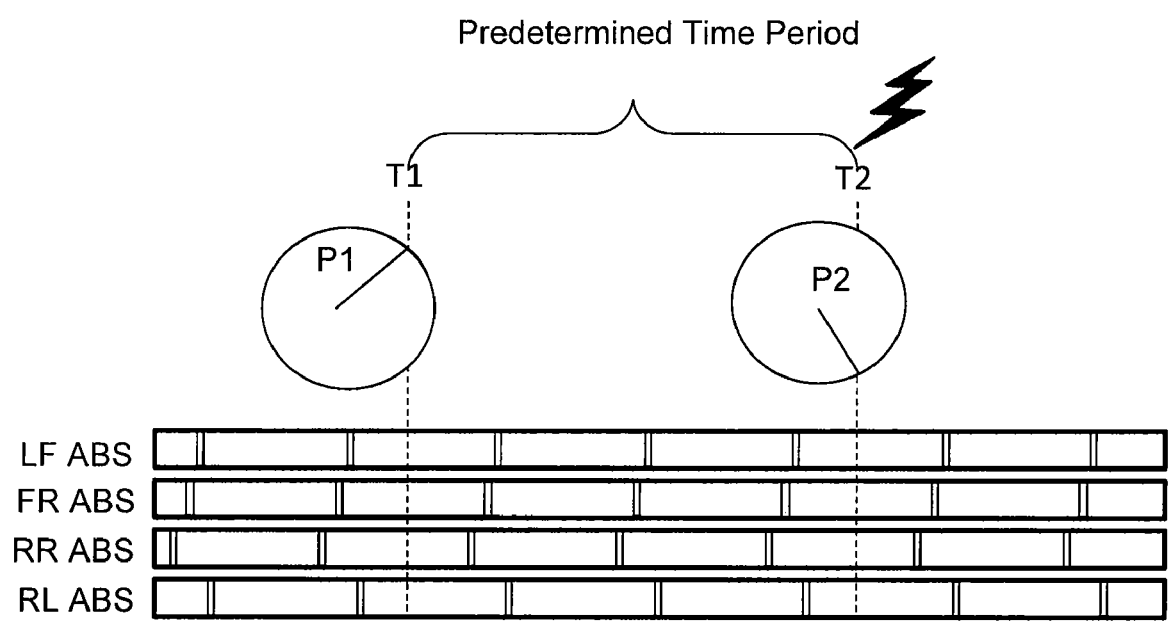
FIG. 4 illustrates correlation between wheel phase angle information from the wheel unit and ABS data.

Referring to FIG. 4, correlation of the wheel phase angle information from the wheel unit 101-104 with the ABS data is further explained. The wheel phase angle sensor 212 measures wheel phase angle at multiple times. In this embodiment, the wheel phase angle sensor 212 measures a first wheel phase angle (P1) at a first time (T1) and waits a predetermined time. The wheel phase angle sensor 212 then measures a second wheel phase angle (P2) at a second time (T2) where T2=T1+Predetermined Time. In this embodiment, the wheel units 101-104 may be pre-programmed to recognize this Predetermined Time. For example, in a tire mounted TPM sensor the act of "striking" the ground provides an indication that the tire sensor has completed a revolution, relative to a previous "strike." If the TPM sensor reports the time since the last strike, then the phase of the wheel can be deduced. It may also be desirable, although not essential, that the period of the wheel revolution may also be sent.

In one embodiment, Predetermined Time (T2−T1) may be fixed and selected to ensure multiple wheel rotations between the first time (T1) and the second time (T2). In case the difference in wheel speed between vehicle wheels may be small, setting the value of the Predetermined Time (T2−T1) to cover multiple wheel rotations may improve accuracy of the auto-location. Accordingly, a tire pressure monitoring system according to this embodiment may sufficiently comply with accuracy requirements. Alternatively, in another embodiment, a period between the first time and the second time (T1, T2) may be variable, whereas a phase angle difference or a phase delta may be fixed. This embodiment will be further explained in detail below.

As discussed in connection with FIG. 2 above, the microcontroller 202 calculates and determines a wheel phase angle difference (PD) by subtracting the second wheel phase angle (P2) from the first wheel phase angle (P1). The wheel phase angle difference (PD) may range between 0 degree and 360 degree. In this embodiment, the wheel units 101-104 may transmit a radio frequency message including the wheel phase angle difference to the ECU 300. The wheel units 101-104 may transmit the radio frequency message at a time that the wheel phase angle difference (PD) is obtained, i.e., the second time (T2). Because the wheel units 101-104 provide the wheel phase angle difference (PD), the ECU 300 may reduce the burden of calculating the wheel phase angle difference. Tire pressure monitoring systems are time-critical applications, and additional time to process the calculation of the wheel phase angle difference (PD) may introduce uncertainty and increase inaccuracy.

As shown in FIG. 1, the ECU 300 periodically receives ABS data from the ABS sensors 201-204. Additionally, Electronic Stability Control (ESC) system may add other inputs, such as steering angle, vehicle yaw, etc. to the ABS system information to help control vehicle progress through curves in the road. For instance, the ECU 300 receives the ABS data every 100 ms. As shown in FIG. 4, a rolling window of ABS data is stored, running from the present point to a point in the past. In this embodiment, the rolling window of the ABS data is stored for each wheel throughout the entire drive. The rolling window of the ABS data is variable and large enough to contain the first time (T1). The stored ABS data provides a historic ABS trace between the first time (T1) and the second time (T2). The ABS data includes information that is used to measure a phase through which the wheel has rotated. In one embodiment, the ABS data may include a number of ABS teeth that pass through the ABS sensors 210-204 during a predetermined period of time. Only as one example, 24 teeth pass through the ABS sensor 210, which indicates completion of a full cycle. The ABS data for the number of counts may be divided by the number of teeth per wheel which is constant. The remainder of the number of counts divided by the number of teeth gives an estimate of wheel angle change over any given period. Using the above example of 24 teeth, $24/24=1$ and the remainder is zero. Accordingly, the ECU 300 determines that there is no wheel phase angle change.

As shown in FIG. 4, the first time (T1) and the second time (T2) may serve as time points at which correlation of wheel phase angles (P1, P2) with ABS data shall occur. The time delay or the time period between the first time (T1) and the second time (T2) may be predetermined in order to ensure generation of effective phase angle data and ABS data that result in accurate auto-location. The time delay or the time period between the first time (T1) and the second time (T2) may be known to the ECU 300 and the wheel units 101-104 such that the first time (T1), the second time (T2), the first phase angle (P1), etc. may be later calculated and determined. Alternatively, in another embodiment, the time period between the first time (T1) and the second time (T2) may be variable.

Figure 5:
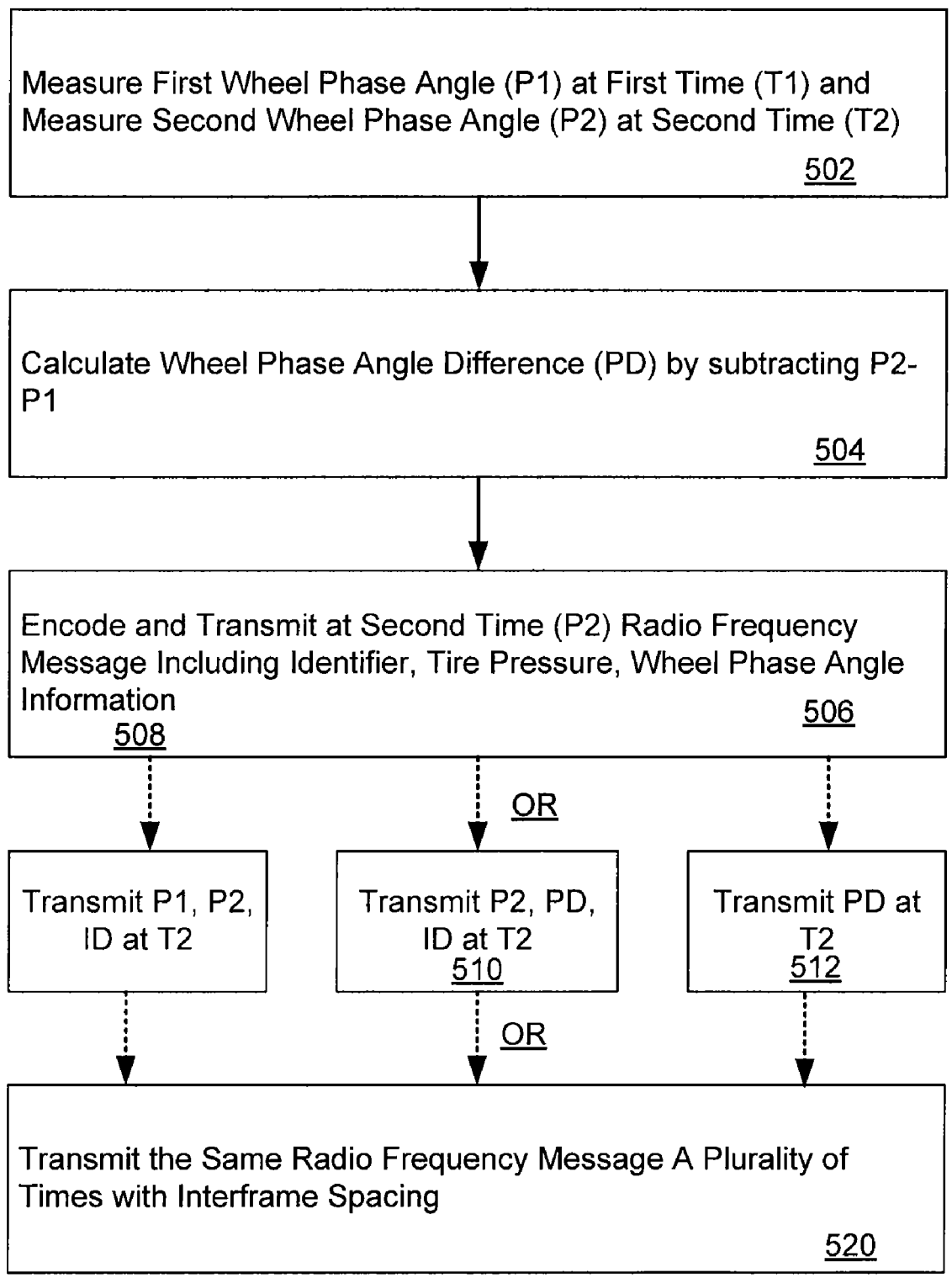
FIG. 5 is a flow chart illustrating one embodiment of a method for performing auto-location of a wheel using wheel phase angle information at the wheel unit.

Referring to FIGS. 5-8, a method for performing auto-location of a wheel using wheel phase angle information is explained in detail. FIG. 5 is a flow chart illustrating one embodiment of a method for performing auto-location of a wheel using wheel phase angle information. In particular, FIG. 5 shows operations at the wheel unit 101 for convenience. The operations at the wheel unit 101 may be equally applicable to the wheel units 102-104. In the embodiment illustrated in FIG. 5, the time period between the first time (T1) and the second time (T2) is pre-determined, whereas a phase angle difference between the first phase angle (P1) and the second phase angle (P2) is variable.

As shown in FIG. 5, at the wheel unit 101, the first wheel phase angle (P1) is measured at the first time (T1) and the second wheel phase angle (P2) is measured at the second time (T2) after passage of the predetermined time (Step 502). At the wheel unit 101, the wheel phase angle difference (PD) is calculated by subtracting P1 from P2 (Step 504). The microcontroller 202 generates the radio frequency message including tire pressure, the identifier of the TPM sensor 208, and the wheel phase angle information. The radio frequency message is transmitted via the transmitter 214 and the antenna 216 (Step 506). The radio frequency message is transmitted a plurality of times (e.g., 5 times or 8 times) to ensure that the ECU 300 receives the message, considering clashing and path loss. Thus, interframe spacing may be introduced to avoid clashing, which occurs when two transmitters transmit at the same time so as to be indistinguishable to the receiver. (Step 520). The same wheel phase angle information is duplicated in each frame 1 to 8. If the first frame of data is not received, then the ECU 300 must be able to calculate the time at which frame 1 was transmitted in order for the wheel phase angle data to be accurate (Step 520). Therefore, the transmitted frames which contain the wheel phase angle information need a predetermined interframe spacing known to the ECU 300. The frames may be numbered 1 through 8, or alternatively, the frame number information could be deduced by the ECU from the interframe spacing.

In one embodiment, the wheel phase angle information includes the first wheel phase angle (P1) and the second wheel phase angle (P2). The wheel unit transmits the first and the second wheel angles (P1 and P2) at the second time (T2) (Step 508). In another embodiment, the wheel phase angle information includes the second wheel phase angle (P2) and the wheel phase angle difference (PD) which is transmitted at the second time (T2) (Step 510). In further another embodiment, the wheel phase angle information includes only the wheel phase angle difference (PD) (Step 512).

Figure 6:
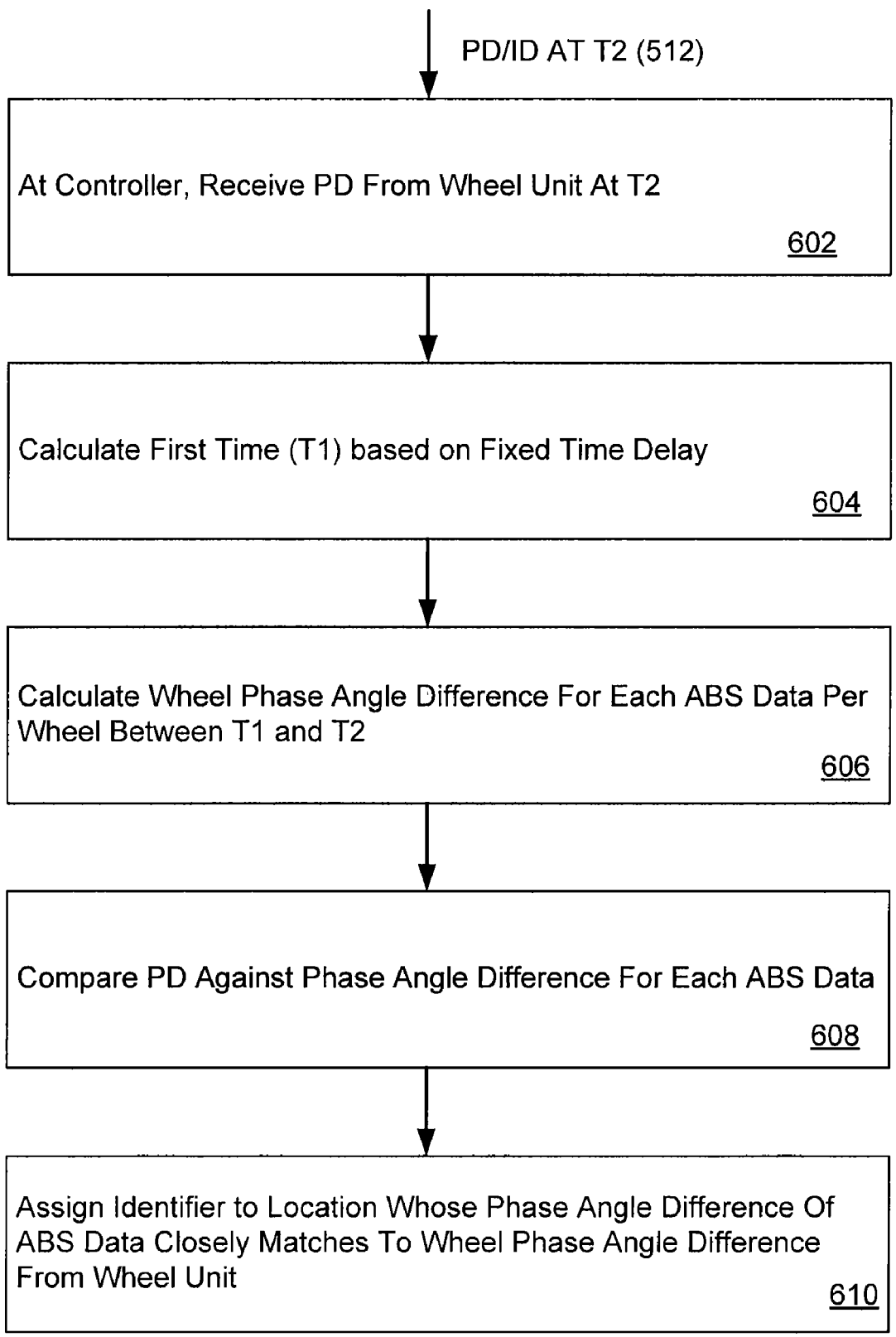
FIG. 6 is a flow chart further illustrating the method for performing auto-location of the wheel at an Electronic Control Unit ("ECU").

FIG. 6 is a flow chart illustrating one embodiment of the method for performing auto-location of the wheel using wheel phase angle information at the ECU 300. In the illustrated embodiment, the wheel phase angle difference (PD) is received at the second time (T2) (Step 602 and Step 512). Here it is assumed that the ECU 300 has received the first frame. The ECU 300 calculates the first time (T1) based on the fixed time delay which is known to the ECU 300 (Step 604). The first time (T1) may need calculation to give a reference point at which the ABS data will be analyzed. As noted above, the period between the first time (T1) and the second time (T2) is set up to ensure that a meaningful phase angle difference between the measured phase angles can be obtained.

After determining the first time (T1), the ECU 300 is able to calculate a phase angle difference for each ABS data per wheel between T1 and T2 (Step 606). Using example discussed above, 48 teeth of ABS teeth that have passed the period between T1 and T2 may indicate two full rotations of the wheel and the zero remainder of 48 teeth/24 teeth indicates zero phase angle difference. The ECU 300 compares the wheel phase angle difference (PD) against the phase angle difference for each ABS data (Step 608). In other words, the ECU may estimate, by interpolation of the RF message phase measurement, what the number of counts from each ABS sensor would have been and search for a match from the ABS data for a wheel unit that has a similar wheel angle. The purpose of the correlation is to determine which set of ABS data matches with the deduced phase rotation of the wheel phase angle sensor 212.

There are a number of ways to perform the interpolation. For example, linear interpolation based on the assumption that the vehicle speed is relatively constant may be used. For example, every wheel on the vehicle will rotate at least 0.1% difference in overall effective circumference. After 60 seconds at 40 kmh (typically 5.5 Hz), the difference in angular rotation of each wheel will likely be 0.001*5.5*60. This equates to ⅓ of a revolution or 120 degrees. As a result, the ECU 300 assigns the identifier to location whose phase angle difference of ABS data mostly closely matches to the wheel phase angle difference transmitted from the wheel unit 101.

Figure 7:
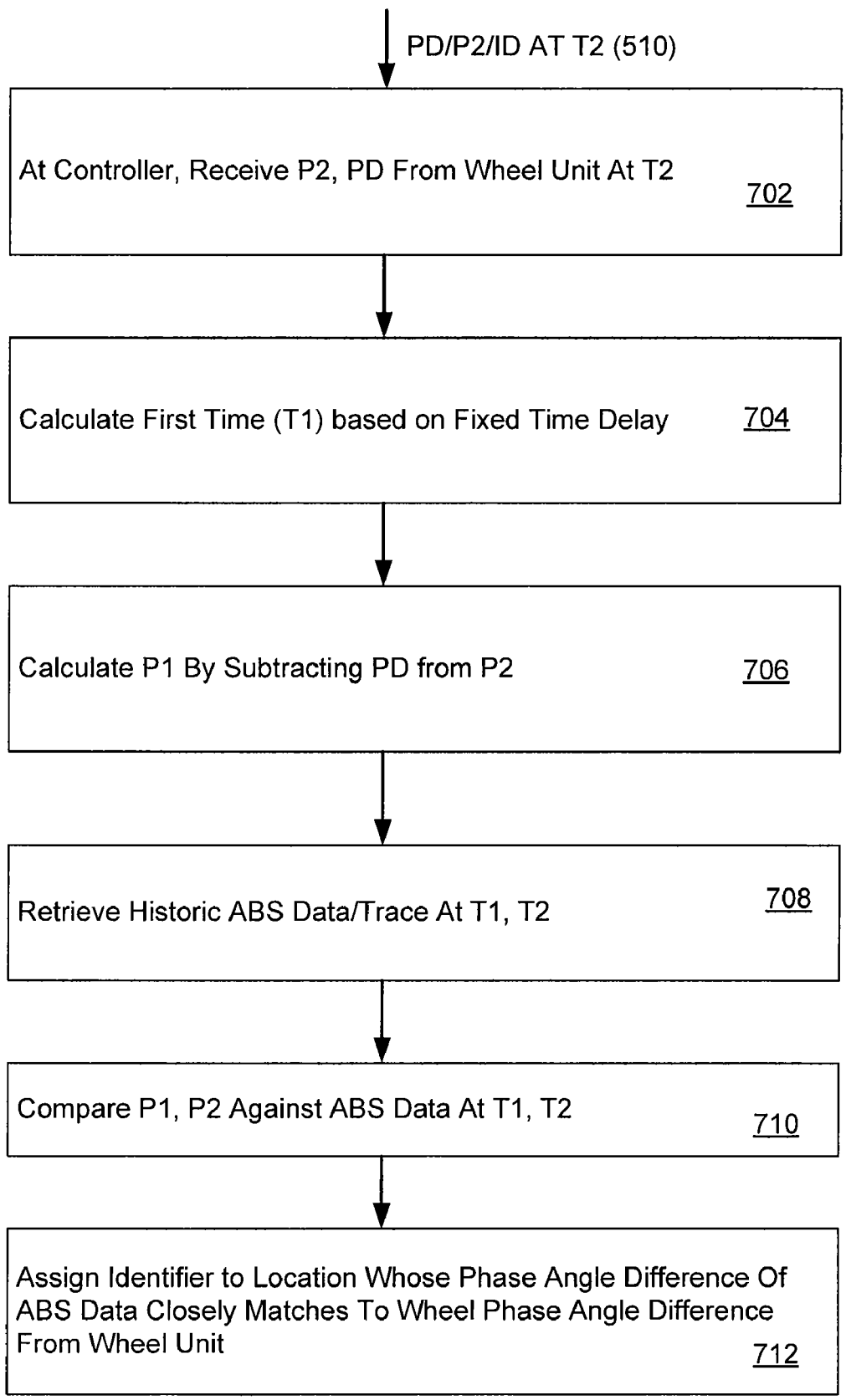
FIG. 7 is a flow chart illustrating another embodiment of the method for performing auto-location of the wheel using wheel phase angle information.

FIG. 7 is a flow chart illustrating another embodiment of the auto-location method. In the illustrated embodiment, the wheel phase angle (P2) and the wheel phase angle difference (PD) are received at the second time (T2) (Step 702 and Step 510, as shown in FIG. 7. It is assumed that the ECU 300 has received the first frame. The ECU 300 calculates the first time (T1) based on the fixed time delay known to the ECU 300 (Step 704). The calculated first time (T1) is a reference point at which the ABS data will be analyzed. The ECU 300 further calculates wheel phase angle (P1) by subtracting the wheel phase angle difference (PD) from the second phase angle (P2) (Step 706). The ECU 300 retrieves historic ABS data that is stored and determines ABS trace at the first and the second times (T1, T2). Subsequently, the ECU 300 compares wheel phase angles (P1, P2) which are transmitted from the wheel unit against ABS data at the first and the second time (T1, T2)(Step 708). As a result, the ECU 300 assigns the identifier to a location whose phase angle difference of ABS data mostly closely matches to the wheel phase angle difference transmitted from the wheel unit (Step 610).

Figure 8:
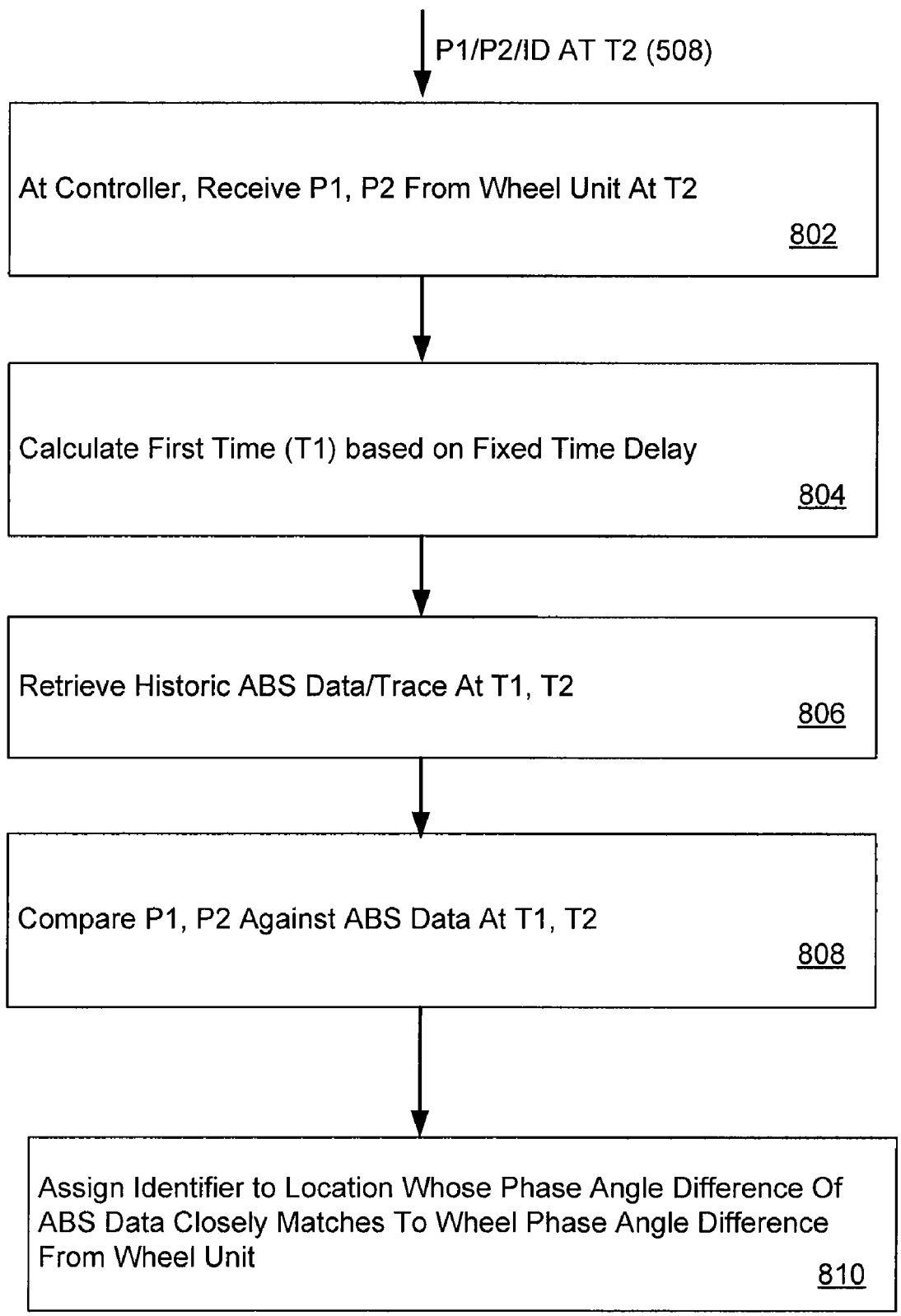
FIG. 8 is a flow chart illustrating another embodiment of the method for performing auto-location of the wheel using wheel phase angle information.

FIG. 8 is a flow chart further illustrating another embodiment of the auto-location method. In the illustrated embodiment, the wheel phase angles (P1, P2) are received at the second time (T2) (Step 802), as shown in FIG. 8, unlike the embodiments illustrated in FIGS. 7 and 8. The ECU 300 calculates the first time (T1) based on the fixed time delay as the reference point (Step 804). Subsequently, the ECU 300 retrieves stored ABS data and determines ABS trace at the first and the second times (T1, T2) (Step 806). The ECU 300 then compares wheel phase angles (P1, P2) which are transmitted from the wheel unit 101 against ABS data at the first and the second time (T1, T2) (Step 808). As a result, the ECU 300 assigns the identifier to location whose phase angle difference of ABS data most closely matches to the wheel phase angle difference transmitted from the wheel unit (Step 808).

As discussed in connection with the above-described embodiments, the wheel units 101-104 measure the wheel phase angle of the associated wheels FL, FR, RL and RR at two different times and determine the relative phase angle difference. The relative phase angle difference is transmitted to the ECU 300 at a later measurement time such that the relative phase angle difference is compared with similar information extracted from the ABS system. The ECU 300 will receive RF messages from the wheel units 101-104 including the phase angle difference and compare the phase angle difference from the wheel units 101-104 with the ABS data from the ABS sensors 201-204. The ECU 300 periodically receives the ABS data and stores a variable rolling window of the ABS data which covers the first time (T1) and the second time (T2). Thus, the ECU 300 may estimate, by interpolation of the RF message phase measurement, what the ABS data from each ABS sensor would have been between the first time (T1) and the second time (T2) and search for a match from the ABS data for a wheel unit that has a similar wheel angle. The purpose of the correlation is to determine which set of ABS data matches with the deduced phase angle of the wheel phase angle sensor 212.

In the above-described embodiments, the ECU 300 determines and uses as a reference point the first and the second time T1, T2 in order to perform the auto-location. The ECU 300 calculates the first time based on the second time T2 and the fixed time delay known to the ECU 300. The ECU 300 then determines ABS data that corresponds to the first and the second time T1 and T2. In other words, the above-described embodiments rely upon the first time (T1) and the second time (T2) to define a relevant wheel phase angle and relevant ABS data for correlation. By comparing two different sets of data within the identical reference points, T1 and T2, accurate correlation may be obtained. Simple and accurate implementation of correlation between the wheel phase angle information from the wheel units 101-104 and the ABS data may be obtained. Furthermore, the period between the first time (T1) and the second time (T2) may be easily variable to accommodate changing situations and ensure the system accuracy requirements.

Moreover, as the wheel units 101-104 may calculate and determine the phase angle difference, calculation burdens on the ECU 300 may be reduced. Because a tire pressure monitoring system is a time-sensitive application, reduced calculation time by the ECU 300 may increase accuracy and efficiency of such systems.

Figure 9:
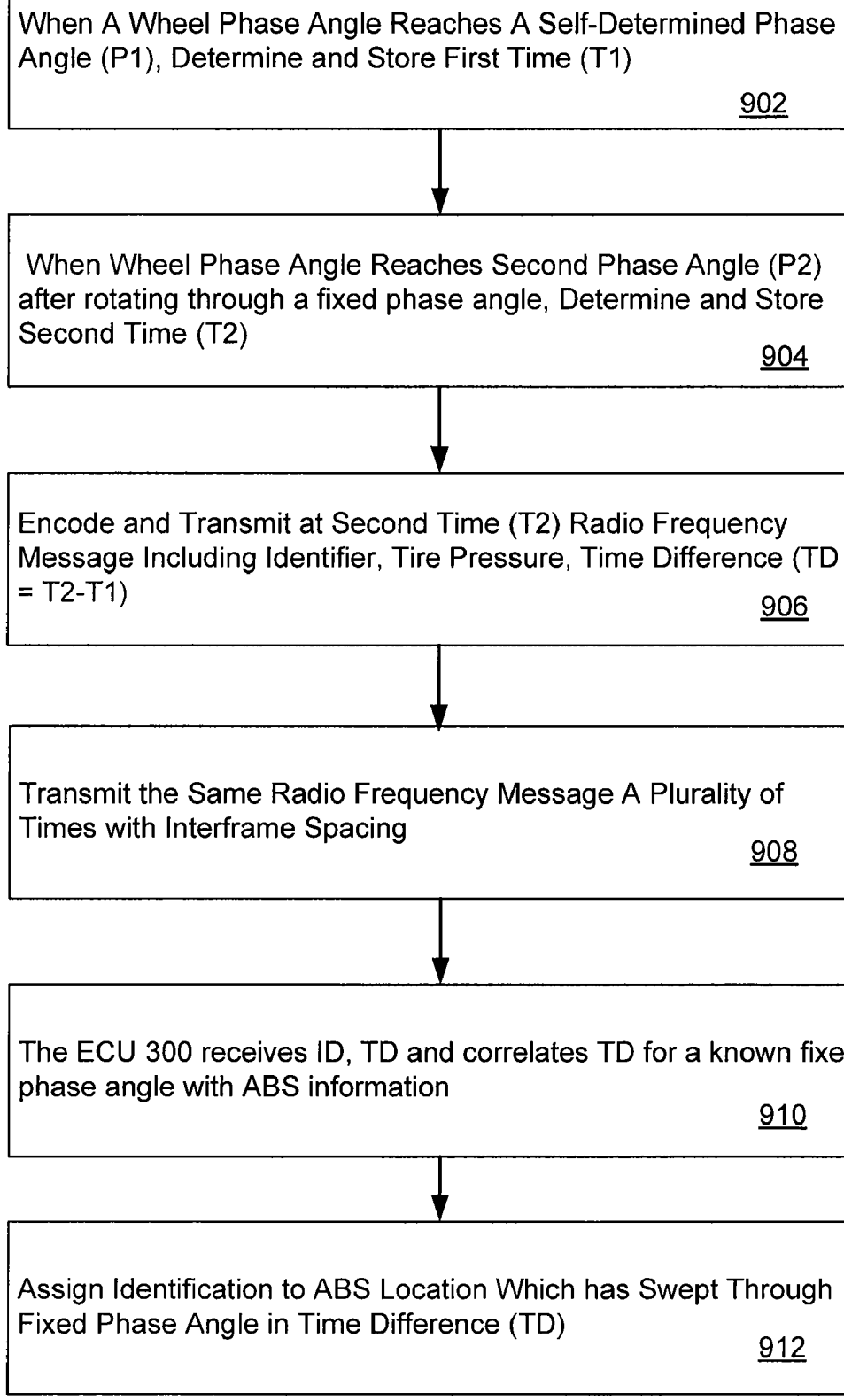
FIG. 9 is a flow chart illustrating another embodiment of the method for performing auto-location of the wheel using wheel phase angle information.

In the above-described embodiments, auto-location is performed based on the fixed time delay between the phase angle measurements and the variable phase angle difference. In another embodiment, the auto-location may also be realized by the wheel units 101-104 and the ECU 300 knowing a fixed phase angle difference or a fixed phase delta which will occur between variable measurements times (TD=T2−T1). In other words, the phase delta is fixed, and the period between the first time (T1) and the second time (T2), i.e., T2−T1 is variable. Referring to FIG. 9, the embodiment where the phase delta is fixed and the time period (T2−T1) is variable is explained in detail. When a wheel unit 102 decides to perform an auto-location event, the wheel unit 102 waits until it reaches a self-determined phase angle (P1). The wheel unit 102 then determines the time that the self-determined phase angle (P1) is reached and stores such time (T1) (Step 902). In this embodiment, the wheel unit 102 is discussed only for convenience and other wheel units 101, 103 and 104 may be equally available. After rotating through the fixed phase delta known to the wheel unit 102 and the ECU 300, the wheel unit 102 reaches the second phase angle P2 (P2=P1+fixed phase delta) (Step 904). The wheel unit 102 determines the time that the second phase angle P2 is reached and stores the time (T2) (Step 904).

The wheel unit 102 transmits the identification, and Time Difference (TD=T2−T1) (Step 906). As discussed above in conjunction with FIG. 5, the wheel unit 102 transmits the same radio frequency message a plurality of times to ensure that the ECU 300 receives the radio frequency message (Step 908). The ECU 300 receives the identification and the Time Difference (TD). The ECU 300 correlates the Time Difference (TD) for a known phase angle with ABS information (Step 910). The identification is assigned to the ABS location which has swept through the fixed phase angle in the Time Difference (TD) (Step 912). In this implementation, the fixed phase angle does not have to be an integer number of revolutions. In other words, the second phase angle (P2) does not have to equal (P1+(N*360°)), where N is an integer. The phase difference (PD) could be encoded in the transmission at T2, or it could be a pre-determined value which is known to both the wheel unit and the ECU.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A method for performing auto-location of a wheel in a vehicle using wheel phase angle information, comprising the steps of:

arranging a wheel unit to be associated with a wheel of the vehicle, the wheel unit comprising a tire pressure monitoring sensor and a wheel phase angle sensor and the wheel unit transmitting tire pressure measured by the tire pressure monitoring sensor;

arranging an antilock brake system ("ABS") sensor to be associated with each wheel of the vehicle, the ABS sensor producing ABS data indicative of the wheel phase angle;

upon rotation of the wheel, measuring a wheel phase angle at a first time (T1) and at a second time (T2) with the wheel phase angle sensor;

at the second time (T2), transmitting from the wheel unit a frame of data comprising wheel phase angle information and an identification of the tire pressure monitoring sensor;

at an electronic control unit ("ECU"), receiving the frame of data and calculating, by a processor, the first time (T1) based on a predetermined time delay;

receiving the ABS data associated with each wheel;

correlating, by the processor., the wheel phase angle information with the ABS data at the calculated first time (T1) and the second time (T2); and assigning the identification to a location of the wheel whose ABS data matches with the wheel phase angle information.

2. The method of claim 1, further comprising:

at the wheel unit, calculating a phase angle difference of the measurements of the wheel phase angle at the first time (T1) and the second time (T2).

3. The method of claim 2, wherein the step of transmitting further comprises at the second time (T2), transmitting from the wheel unit the frame of data comprising the phase angle difference and the identification.

4. The method of claim 2, wherein the step of transmitting further comprises at the second time (T2), transmitting from the wheel unit the frame of data comprising the phase angle difference, the phase angle measurement at the second time (T2) and the identification.

5. The method of claim 1, wherein the step of transmitting further comprises at the second time (T2), transmitting from the wheel unit the frame of data comprising the phase angle measurements at the first time (TI) and the second time (T2) and the identification.

6. The method of claim 1, wherein the step of transmitting further comprises transmitting the frame of data multiple times, wherein the frame of data is transmitted with interframe spacing between each transmission.

7. The method of claim 1, wherein the step of providing ABS data indicative of the wheel phase angle comprises providing the ABS data representing a count of a number of ABS teeth that have passed each ABS sensor in a given period of time.

8. The method of claim 7, wherein the step of correlating comprises comparing the phase angle information with the count of the number of ABS teeth or data which represents the number of ABS teeth that have passed each ABS sensor between the calculated first time (TI) and the second time (T2).

9. A method for performing auto-location of a wheel in a vehicle using wheel phase angle information, comprising the steps of:

arranging a wheel unit to be associated with a wheel of the vehicle, the wheel unit comprising a tire pressure monitoring sensor and a wheel phase angle sensor and the wheel unit transmitting tire pressure measured by the tire pressure monitoring sensor;

arranging an antilock brake system ("ABS") sensor to be associated with each wheel of the vehicle, the ABS sensor producing ABS data indicative of the wheel phase angle;

upon rotation of the wheel, measuring a first time (T1) that a wheel phase angle reaches a first phase angle (P1) with the wheel phase angle sensor;

measuring a second time (T2) that the wheel phase angle reaches a second phase angle (P2) after the wheel rotates a predetermined phase angle known to the wheel unit;

transmitting from the wheel unit a radio frequency message comprising an identification of the tire pressure monitoring sensor and a time difference between the first time (T1) and the second time (T2);

at a processor of an electronic control unit ("ECU"), receiving the radio frequency message;

receiving the ABS data associated with each wheel and determining wheel phase information represented by the ABS data, wherein the predetermined phase angle is known to the ECU unit;

correlating, by the processor the time difference with the ABS data; and assigning the identification to a location of the wheel whose ABS data matches with the predetermined phase angle within the time difference.

10. The method of claim 9, wherein the predetermined phase angle is constant, and the time difference is variable.

11. The method of claim 9, wherein the step of measuring a first time (T1) further comprises measuring the first time (T1) that the wheel phase angle reaches a self-determined first phase angle; and the method further comprising:

storing the first time (T1) and the second time (T2) at the wheel unit.

12. A tire pressure monitoring system for performing auto-location of a wheel in a vehicle using wheel phase angle information, comprising:

a wheel unit to be associated with a wheel of the vehicle, the wheel unit comprising:

a tire pressure monitoring sensor that measures tire pressure of the wheel; and a wheel phase angle sensor that measures a wheel phase angle at a first time (T1) and at a second time (T2);

wherein the wheel unit transmits at the second time (T2) a radio frequency message comprising:

wheel phase angle information, an identification of the tire pressure monitoring sensor; and the measured tire pressure;

an antilock brake system ("ABS") sensor associated with each wheel of the vehicle and operable to provide ABS data indicative of the wheel phase angle;

an electronic control unit ("ECU") in communication with the wheel unit and the ABS sensor, the ECU operable to execute instructions of:

calculating the first time (T1) based on a predetermined time delay; correlating the wheel phase angle information with the ABS data at the calculated first time (T1) and the second time (T2); and assigning the identification to a location of the wheel whose ABS data matches with the wheel phase angle information.

13. The system of claim 12, wherein the ABS data indicative of the wheel phase angle comprises a count of a number of ABS teeth or data which represents the number of ABS teeth that have passed each ABS sensor in a given period of time.

14. The system of claim 12, wherein the ECU is operable to execute instructions of periodically receiving the ABS data and store the ABS data to generate a historic ABS trace.

15. The system of claim 12, wherein the ECU is programmed to recognize the predetermined time delay.

16. The system of claim 12, wherein the ECU is further operable to execute instructions of receiving a period of wheel revolution from the ABS sensor.

17. A wheel unit for use with a tire pressure monitoring system for performing auto- location of a wheel in a vehicle using wheel phase angle information, comprising:
- a tire pressure monitoring sensor that measures tire pressure of the wheel; and
- a wheel phase angle sensor that measures a wheel phase angle at a first time (T1) and at a second time (T2);
- an electronic circuit that determines a wheel phase angle difference based on wheel phase angle measurements at the first time (T1) and the second time (T2) and encodes a radio frequency message comprising wheel phase angle information, an identification of the tire pressure monitoring sensor and the measured tire pressure; and
- a radio frequency transmitter that transmits the radio frequency message at the second time (T2);
- wherein the wheel unit is associated with each wheel of the vehicle.

18. The wheel unit of claim 17, wherein the wheel phase angle sensor comprises a shock sensor.

19. The wheel unit of claim 17, wherein the wheel phase angle sensor comprises an accelerometer.

20. The wheel unit of claim 17, wherein the wheel phase angle sensor comprises a Hall effect sensor or a sensor that responds to a road strike by the wheel.

21. A tire pressure monitoring system for performing auto-location of a wheel in a vehicle using wheel phase angle information, comprising:
- a wheel unit comprising:
  - a tire pressure monitoring sensor that measures tire pressure of the wheel; and
  - a wheel phase angle sensor that determines a first time (T1) when the wheel rotates to reach a first phase angle (PI) and a second time (T2) when the wheel further rotates through a predetermined phase angle to reach a second phase angle (P2);
  - an electronic circuit that stores the first and the second time (TI, T2) and determines a time difference (T2−T1) between the first time (T1) and the second time (T2), the electronic circuit further operable to encode a radio frequency message comprising the time difference, an identification of the tire pressure monitoring sensor and the measured tire pressure; and
- an antilock brake system ("ABS") sensor associated with each wheel of the vehicle and operable to provide ABS data indicative of the wheel phase angle;
- an electronic control unit ("ECU") in communication with the wheel unit and the ABS sensor, the ECU operable to execute instructions of:
  - receiving the time difference and the identification;
  - correlating the time difference with wheel phase angle information represented by the ABS data; and
  - assigning the identification to a location of the wheel whose ABS data has swept through the predetermined phase angle within the time difference.

\* \* \* \* \*